United States Patent
Boddukuri et al.

(10) Patent No.: US 10,656,834 B2
(45) Date of Patent: May 19, 2020

(54) TRANSPARENT CAPI EXPLOITATION FOR LEGACY APPLICATION

(71) Applicant: International Business Machines Corporation, Armonk, NY (US)

(72) Inventors: Vinod K. Boddukuri, Hyderabad (IN); Phani Kumar V. U. Ayyagari, Hyderabad (IN); Venkata N. S. Anumula, Hyderabad (IN); Sudhir Maddali, Hyderabad (IN); Sanket Rathi, Hyderabad (IN); Bruce G. Mealey, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 15/798,761

(22) Filed: Oct. 31, 2017

(65) Prior Publication Data

US 2019/0129619 A1    May 2, 2019

(51) Int. Cl.
| | |
|---|---|
| *G06F 3/06* | (2006.01) |
| *G06F 13/16* | (2006.01) |
| *G06F 13/38* | (2006.01) |
| *G06F 13/24* | (2006.01) |

(52) U.S. Cl.
CPC ............ *G06F 3/0607* (2013.01); *G06F 3/065* (2013.01); *G06F 3/0619* (2013.01); *G06F 3/0674* (2013.01); *G06F 13/1663* (2013.01); *G06F 13/382* (2013.01); *G06F 13/24* (2013.01)

(58) Field of Classification Search
CPC ...... G06F 13/126; G06F 3/0659; G06F 16/13; G06F 16/148; G06F 16/168; G06F 16/1847; G06F 3/0611; G06F 3/0643; G06F 3/0661; G06F 3/0679; G06F 3/068; G06F 3/0688; G06F 13/1663; G06F 13/24; G06F 13/382; G06F 3/0607; G06F 3/0619; G06F 3/065; G06F 3/0674
See application file for complete search history.

(56) References Cited

U.S. PATENT DOCUMENTS

| | | | |
|---|---|---|---|
| 9,015,353 B2* | 4/2015 | Shapiro ................. | G06F 3/0643 710/5 |
| 2019/0121738 A1* | 4/2019 | Ono ..................... | G06F 12/0831 |

OTHER PUBLICATIONS

Sendir et al., Optimized Durable Commitlog for Apache Cassandra Using CAPI-Flash, 2016 IEEE 9th International Conference on Cloud Computing, © 2016 IEEE, 8 pages.
IBM, "AIX Kernel CAPI Flash Support", 4 pages, https://www.ibm.com/developerworks/.../api/.../CAPI_devworks_v7.pdf.

* cited by examiner

*Primary Examiner* — Idriss N Alrobaye
*Assistant Examiner* — Richard B Franklin
(74) *Attorney, Agent, or Firm* — Jay Wahlquist

(57) ABSTRACT

An interface superpipe is implemented in a filesystem. A filesystem in a kernel, receives a command to open a file, the command issued in the execution of a process in an application. The file is determined to be on an interface disk. It is determined that a context does not exist for the process and, in response, an adapter queue is allocated for the process in a kernel memory and mapped into a process address space associated with the process. The context information of the process is saved in the kernel memory. The filesystem may be part of a system further comprising a processor, a storage, an interface adapter in communication with the storage and sharing a memory space with the processor, and an application in communication with the filesystem.

7 Claims, 6 Drawing Sheets

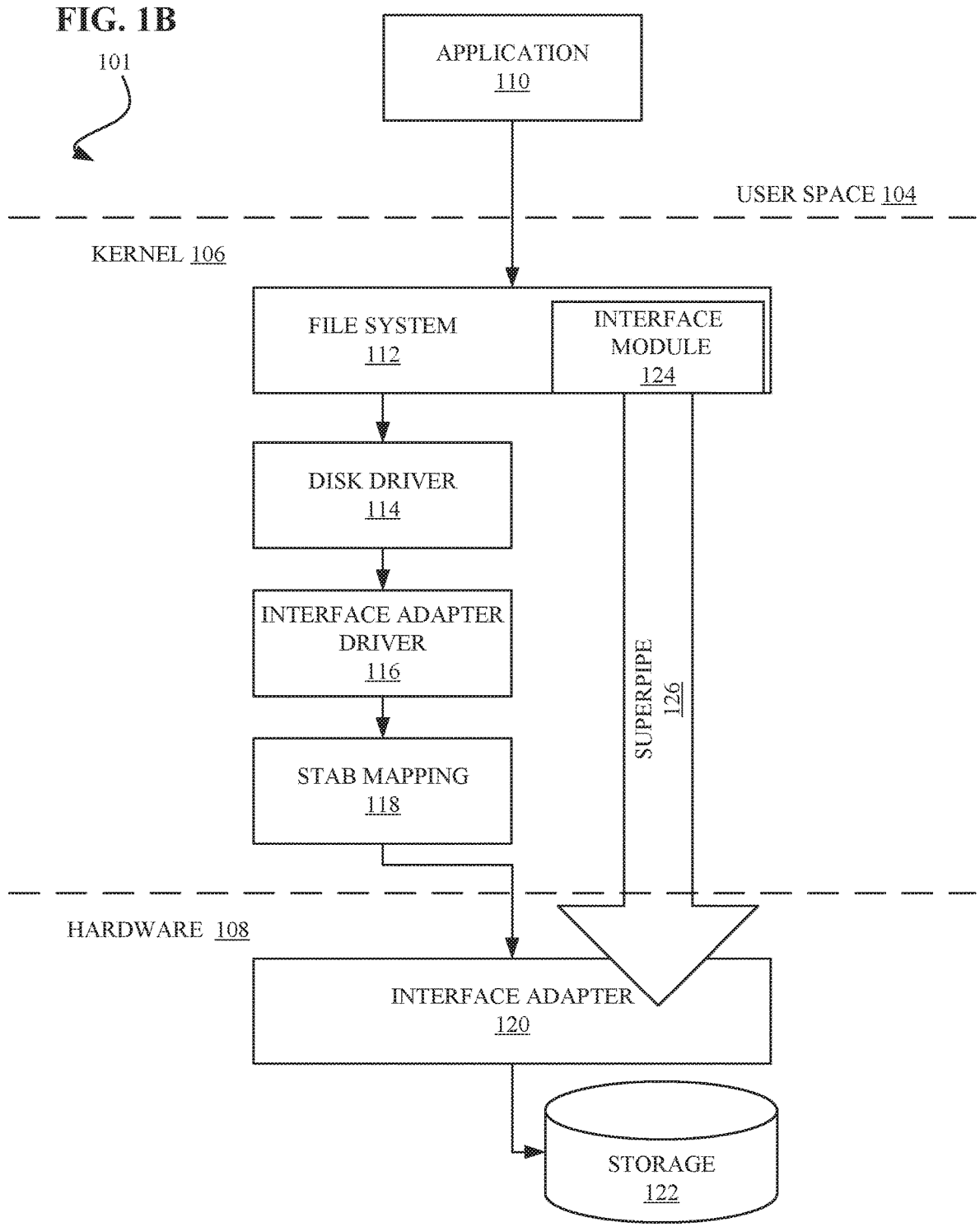

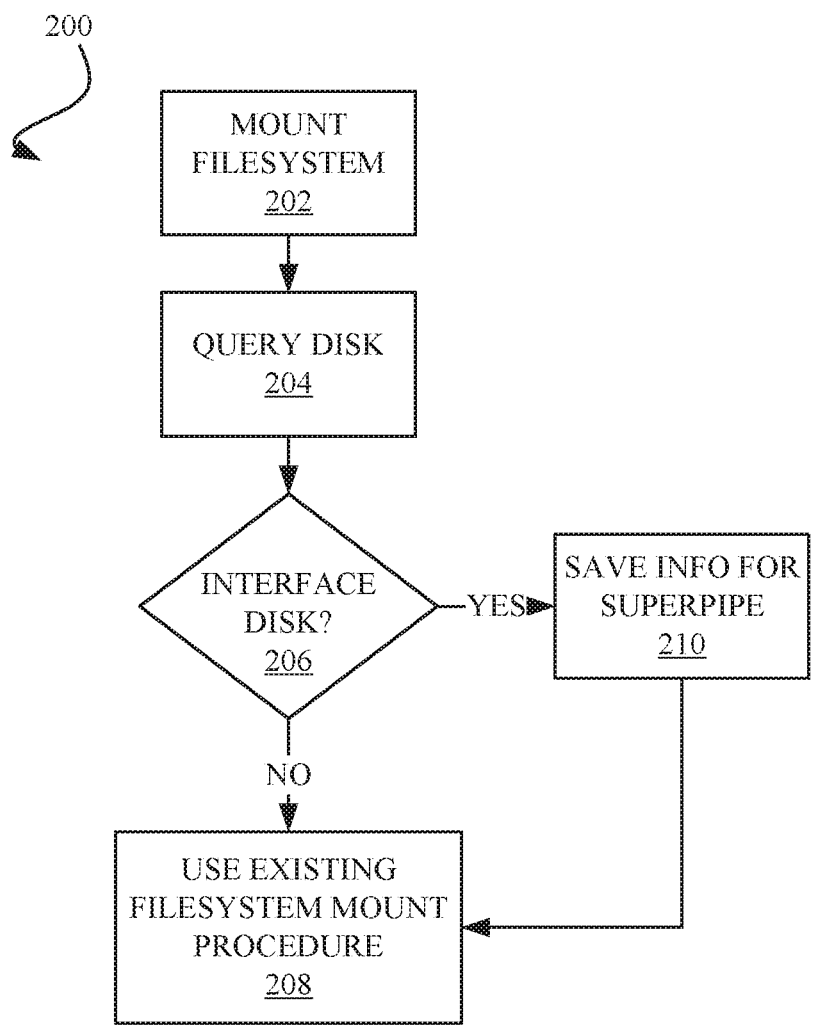

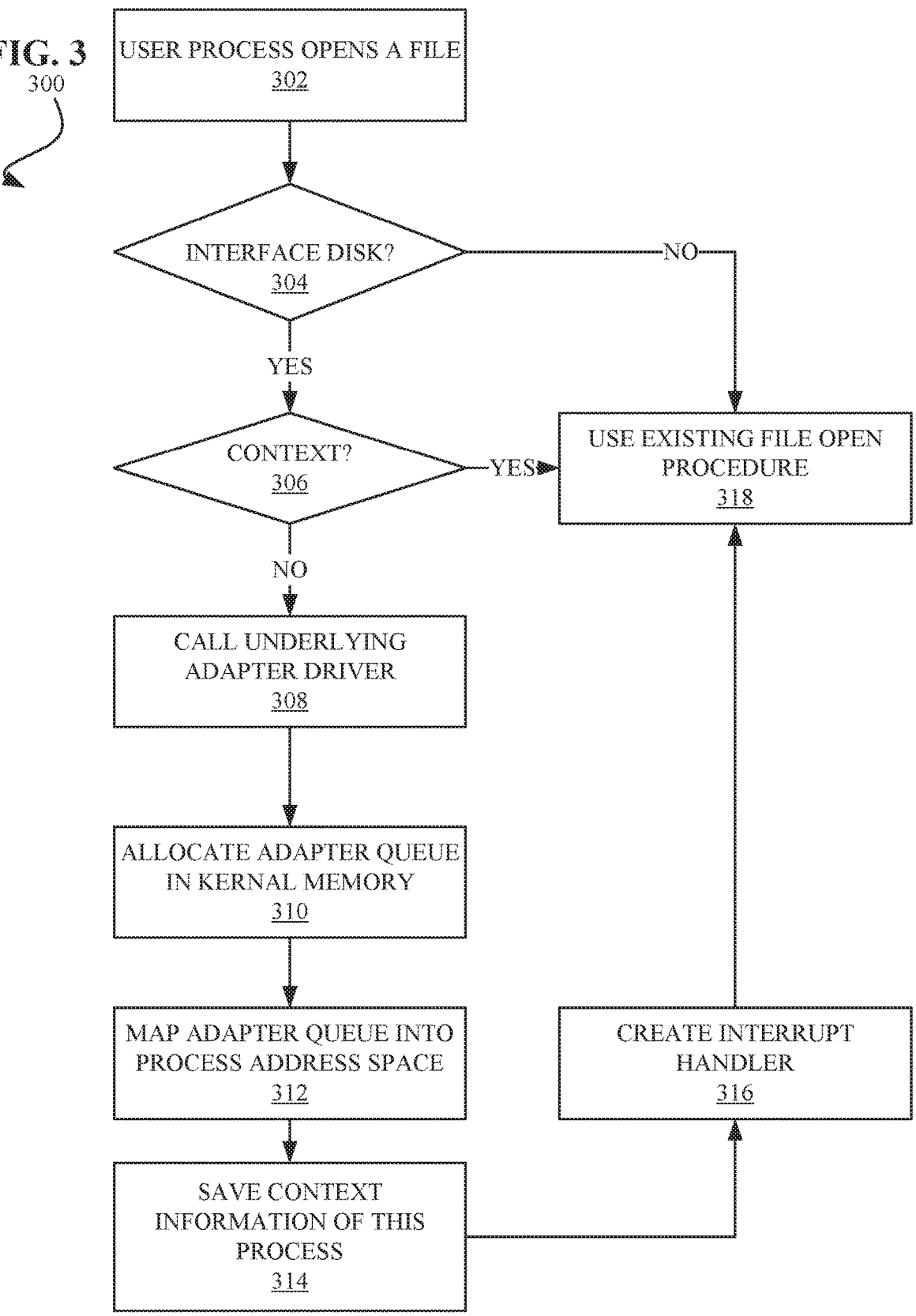

TRANSPARENT CAPI EXPLOITATION FOR LEGACY APPLICATION

BACKGROUND

The present disclosure relates to implementing an interface standard and more specifically, to transparent exploitation of a high-speed interface standard with an unmodified legacy application.

Coherent Accelerator Processor Interface (CAPI) technology provides accelerated I/O functionality and memory coherency between a processor and a hardware accelerator. Because interface adapters contain their own memory management unit, which performs address translation and exception generation logic, they do not require translation control entry to access memory. Thus having the ability to read and write to an application's memory, the interface system can accelerate I/O functionality.

SUMMARY

According to embodiments of the present disclosure, described herein is a system for using a high-speed interface standard with a legacy application. The system comprises a processor, a storage, an interface adapter in communication with the storage and sharing a memory space with the processor, a filesystem, in a kernel, in direct communication with the interface adapter, and an application in communication with the filesystem.

Also described herein is computer-implemented method for implementing an interface superpipe in a filesystem. The method proceeds by receiving, by a filesystem in a kernel, a first command to open a file, the first command to open a file issued in the execution of a process in an application. The file is determined to be on an interface disk. It is determined that a context does not exist for the process and, in response, an adapter queue is allocated for the process in a kernel memory and the adapter queue is mapped into a process address space associated with the process. The context information of the process is saved in the kernel memory.

A computing system and computer program product can embody the method and structures of the disclosure. The computing system can comprise a network, a memory configured to store process context information, and a processor in communication with the memory. The computing system can be configured to perform the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 1B depicts an example system for implementing an interface superpipe from a filesystem in a kernel, according to embodiments of the present disclosure.

FIG. 2 depicts a flowchart of an example filesystem mount procedure, according to embodiments of the present disclosure.

FIG. 3 depicts a flowchart of an example file open procedure, according to embodiments of the present disclosure.

Figure 1A:
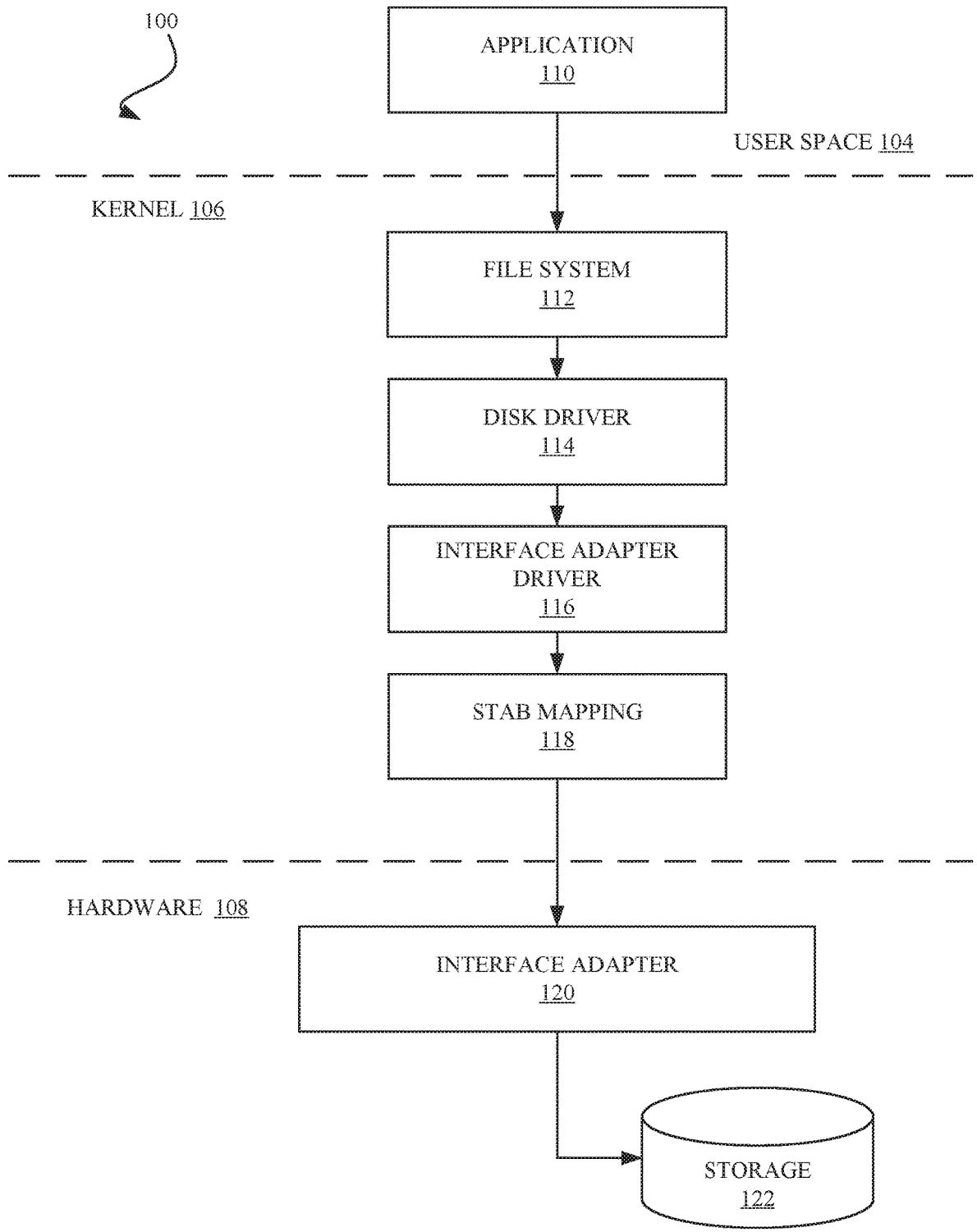
FIG. 1A depicts an example system of a legacy application accessing an interface storage using a traditional input/output communication mode.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to implementing an interface standard with a legacy application, more particular aspects relate to implementing a high-speed processor interface standard with an unmodified legacy application. While the present disclosure is not necessarily limited to such applications, various aspects of the disclosure may be appreciated through a discussion of various examples using this context.

Referring now to FIG. 1A, an example system 100 of a generic legacy application 110 accessing a storage 122 via an interface adapter 120 using a traditional input/output communication (I/O) mode is depicted. Storage 122 and the interface adapter 120 are components of system hardware 108. The interface adapter 120 may share memory space with one or more system processors via an interface proxy integrated with the one or more processors. The interface adapter and the system processors may thus be able to read and write directly into each other's memory. In embodiments, interface adapter 120 may be a Coherent Accelerator Processor Interface (CAPI) adapter, or a Power Service Layer. The interface proxy may likewise be a Coherent Accelerator Processor Proxy.

Application 110, occupying a user space 104, executes a process requiring access to a storage 122. Using the traditional I/O method, the command issues through the operating system (OS) I/O stack in the kernel 106 which has been updated to support access to an adapter storage, e.g. a fast storage accessed via an accelerator adapter, and involves each of a filesystem 112, a disk driver 114, an interface adapter driver 116, and the kernel's Segment Table (STAB) mapping service 118.

STAB mapping 118 allocates and associates contexts created by the interface adapter driver 116 to a kernel memory STAB. Using this method, all I/Os are mapped into the STAB with a kernel context and then issued (to the interface adapter 120) using the mapped kernel context. The context provides a minimal set of data required to enable a process to be interrupted and later continued from the same point, e.g. tasks completed and to be completed, registers to be referenced and updated, etc.

This method allows existing legacy applications to work with an adapter storage without the application needing to be modified or recompiled, but it suffers from delays involved in the various OS layers (Buffer Cache, Logical Volume Manager, Disk Driver, the filesystem itself, etc.) as well as the Adapter/Protocol drivers and direct memory access mapping.

Existing technologies (such as the CAPI Flash Accelerator) attempt to overcome these delays through integration of a superpipe I/O process into the application itself. In this method, the OS I/O stack 112-118 is fully bypassed and the application 110 is modified to perform I/Os directly to the interface adapter 120 from the user space 104. In this method, a user context is created for the process where the process's STAB access is given directly to the interface adapter. Memory mapped I/O registers related to the context are mapped into the process address space, allowing the process to perform IOs directly from the user space. The process address space may generally be a range of either physical or virtual addresses accessible to or reserved for the process. It may refer to the amount of memory allocated for the process, and may specify individual units of memory. The format of the address space may be determined by the processor executing the process.

The interface adapter may be able to access process memory using the process's STAB (for example, if the interface adapter is CAPI adapter, the CAPI adapter shares memory space with one or more of the system's processors), and therefore no mapping is needed for direct memory access. In embodiments, the interface adapter may be an accelerator function unit, or part of an accelerator function unit.

This user space superpipe method provides very low latency, but the application must be modified to create the user context and issue I/O commands. Because this method requires the application to be modified and recompiled, it leads to adaptability problems.

Disclosed herein is a method and system for avoiding the delays associated with the OS I/O stack while also providing compatibility with legacy applications and simultaneously exploiting interface technology advantages. By implementing the interface superpipe through the filesystem in the kernel, the advantages of the superpipe I/O method may be achieved without the loss of adaptability associated with integrating the superpipe with the application.

The disclosed method and system provide for transparent exploitation of a superpipe with an interfaced storage, e.g. a storage disk access via a CAPI adapter interface, with the associated low latency and reduced processor usage, while supporting continued use of an existing filesystem interface with the superpipe. This means that there is no new filesystem to vet, and that all existing filesystem tools can be used without requiring any modification.

Implementing the superpipe I/O in the kernel does create memory allocation challenges, specifically as to how to ensure queues and command pools are available to the interface adapter when they will be created in the filesystem, in the kernel, for each context and application. To overcome this, the disclosed method and system provide access to the application address space from the kernel. This may be accomplished by the filesystem itself, by an interface module in the filesystem, or otherwise executed in the kernel. A segment is created in the kernel STAB to store the context and maps it to both the kernel address space and the process address space in the application (the subset of the application's total address space available to the process). The process and application may generally be implemented by a processor, and thus may share memory space with the interface adapter, e.g. a CAPI adapter, while the filesystem and other kernel component reside in and operate from a system main memory.

Mapping the segment to the kernel address space makes the context available to the kernel code and thus to the filesystem, providing a reference for queue access and command completion and submission. Mapping the segment to the process address space in the application provides access to the context for the interface adapter itself, as any process that creates an interface context will provide its address space to the adapter.

Referring now to FIG. 1B, an example system 101 is depicted for implementing a superpipe 126 from the filesystem 112 directly to the interface adapter 120, according to embodiments of the present disclosure. It is to be understood that the depicted organization of the example system 101 as in FIG. 1B is to be non-limiting, as other possible organizations/configurations are possible.

The system comprises a storage 122 in communication with an interface adapter 120, in a hardware space 108, which in turn provides communication to a kernel space 106. The kernel 106 contains a filesystem 112, which may contain an interface module 124, able to directly communicate with the interface adapter 120. The interface module 124 communicates with the interface adapter 120 via a superpipe 126. The interface module 124 may store process context information in the kernel memory. The interface module 124 may use the process context information to build commands for the interface adapter 120. The process context information allows the interface module 124 to create the illusion that commands and queues are allocated in process, and enables the interface adapter 120 to access the proper context for commands issued through the superpipe 126. In embodiments, the process context information may be stored in the filesystem 112, absent the interface module 124, and the filesystem 112 may use the process context information to build commands for the interface adapter 120.

When the filesystem 112 is mounted, the underlying storage disk 122 is queried. If the filesystem determines that it is an interface disk (e.g. accessed via the interface adapter 120 from FIG. 1B) then that information is saved to inform the filesystem 112 that the superpipe 126 may be used for direct I/Os to the storage 122.

Upon opening a file with the filesystem 112, a process context is located or created for the process opening the file. An interface process context is created by calling the underlying interface adapter driver 116. The interface adapter driver 116 provides access to STAB mapping 118 for the interface adapter 120 and returns memory-mapped I/O register mapping to the kernel memory for context. A queue for the interface adapter 120 may be maintained in the kernel, for instance by the interface module 124 in the filesystem 112.

The system 101 further comprises an OS I/O stack in the kernel 106 including the filesystem 112, a disk driver 114, the interface adapter driver 116, and STAB mapping service 118. The interface adapter driver 116 supports a legacy path for communication between the filesystem 112 and the interface adapter 120. When the superpipe 126 is in use, the interface module 124, in the filesystem 112, bypasses the interface adapter driver 116, as well as the other components of the OS I/O stack, to issue commands directly to the interface adapter 120. In embodiments, if the filesystem 112 receives a buffered I/O or an I/O with metadata, the I/O may be executed via the legacy path (e.g. the interface adapter driver 116).

The kernel 106 is also in communication with an application 110 in a user space 104. In embodiments, the application 110 uses the filesystem 112 in a direct I/O mode to assist the filesystem 112 in creating valid contexts for the received I/Os. In embodiments, a direct I/O contains the user address in the data buffer. The user address may refer to the portion of memory in the user space 104, or the application 110, where context for the process is stored.

If the filesystem 112 receives a direct I/O from a process in the application 110, and a context exists in the interface module 124 for the I/O, then the filesystem 112 can execute the I/O via the superpipe 126. Buffered I/Os (those containing a kernel address in the data buffer), I/Os containing metadata or management commands, or I/Os not originating in the application 110 may be executed using the traditional I/O stack 112-118. In embodiments, I/Os handled by the traditional I/O stack 112-118 may have a context created and saved to the filesystem 112 for future execution of same or similar I/Os by the superpipe 126.

In embodiments, the interface module 124, the filesystem 112, or the interface adapter 120 may create an interrupt handler for the process. The interface adapter 120 may use the interrupt handler to generate an interrupt at the completion of an I/O or, in embodiments, the filesystem 112 may poll on completion queues as the I/Os are completed back to the application 110. The interface module 124 may issue a command to the interface adapter 120 via the superpipe 126 in response to a direct I/O received by the filesystem 112 from the application 110. When the interface adapter 120 completes the command, the interface adapter 120 may issue the interrupt handler or, depending on the command received, may return data to the filesystem 112 or the application 110. In the latter case, the filesystem may detect that the I/O is complete by the polling the completion queues to see which I/Os issued by the application 110 have been completed and have returned an appropriate target to the application.

The interface module 124 can be a very thin module and, in embodiments, may not be configured to perform error recovery. Instead, the interface module 124 may rely upon the underlying driver stack 112-118 for error recovery. Once an error is reported, the interface module 124 calls the underlying disk driver 114 to perform error recovery.

Further disclosed herein is a computer-implemented method for implementing an interface superpipe in a filesystem. Referring now to FIG. 2, a flowchart of a filesystem mount procedure 200 is shown, according to embodiments of the present disclosure. Method 200 may be executed by one or more processors. Mounting the filesystem may generally be carried out by an operating system.

At operation 202, the filesystem is mounted in the kernel. The filesystem may refer to the filesystem 112 of FIG. 1B and the kernel may refer to kernel 106 of FIG. 1B.

At operation 204, the disk is queried. The disk may be a storage disk such as storage 122 in FIG. 1B. In response to the query, the disk may return data or metadata to support the determination at decision block 106 as to whether to disk is an interface disk, access via an interface adapter (e.g. a CAPI adapter), or otherwise.

At decision block 206, it is determined whether the disk is an interface disk. In embodiments, determining whether the disk is an interface disk may involve detecting that an interface adapter, such as interface adapter 120 of FIG. 1B, is relaying communications directed to the storage disk when the query is issued. The disk may be determined to be an interface disk in response to metadata detected with the disk is queried at operation 204. If it is determined that the disk is not an interface disk, the existing filesystem mount procedure may proceed unmodified, at operation 208. If, at decision block 206, it is determined that the disk is an interface disk, then appropriate context information may be saved for the superpipe (e.g. superpipe 126 from FIG. 1B) at operation 210. The context information may include the user context for the process or task, and may provide a minimal set of data necessary to support continuing the process following an interruption. The information available to the filesystem at mount may be insufficient to fully populate the context information, as a process may not yet be initiated. At mount, the filesystem primarily seeks to identify whether commands may be issued through the superpipe or not. If a queried disk is determined to be an interface disk, e.g. a disk access through an interface adapter such as a CAPI adapter, the filesystem may store information indicating that the identified interface disk may accept commands issued via the superpipe. The system may proceed to complete the existing filesystem mount procedure, as in operation 208.

Referring now to FIG. 3, a flowchart of a file open procedure 300 using an interface superpipe system, such as the system 101 in FIG. 1B, is shown, according to embodiments of the present disclosure. The method 300 may be executed by a filesystem in a kernel, and may generally reside in and operate from a main memory. The kernel may be in communication with and operate one or more processors to execute the method. Generally, files are opened by the filesystem (e.g. filesystem 112 of FIG. 1B) in response to a program or application (e.g. application 110 of FIG. 1B).

At operation 302, the filesystem determines that a user process has opened a file. The process may generally be the execution of program instructions by the application and require access to a storage disk (e.g. storage 122 of FIG. 1B).

At decision block 304, the filesystem determines whether the storage disk to be accessed is an interface disk. In embodiments, determining whether the disk is an interface disk may involve detecting that an interface adapter, such as interface adapter 120 of FIG. 1B, is relaying communications directed to the storage disk. The disk may be determined to be an interface disk according to data or metadata returned in response to a query, such as the query issued in operation 204 of FIG. 2.

If, at decision block 304, the filesystem determines that the target disk is not an interface disk, the method proceeds to operation 318, and opens the file using an existing procedure without any further action. In embodiments, an existing file open procedure opens the file using the OS I/O stack. Once the system has determined the desired file is not on an interface disk, further operations regarding the file may be executed without consideration of the superpipe.

If the filesystem determines that the desired file is on an interface disk, the method proceeds to decision block 306, and the filesystem may engage the interface module, if present, and attempt to locate a stored context for the process. At decision block 306, the system determines whether a context for the process exists in the interface module. If, at decision block 306, the filesystem determines that a saved context already does exist for the process, the method proceeds to operation 318, and opens the file using an existing OS procedure. By identifying that the appropriate context is present in the filesystem before proceeding with the file open procedure, the filesystem is aware that I/Os related to the file being opened may be executed via the superpipe once the file is opened. In embodiments, the context may be found stored in a hash table, in a STAB segment, or otherwise stored in the kernel memory. The presence of the context in the filesystem maintains transparency between the superpipe and the application.

If, at decision block 306, the filesystem determines that a context does not yet exist for the process, the method proceeds to operation 308, and the filesystem creates a context for the process using, in embodiments, the underlying driver stack.

At operation 308, the filesystem calls the underlying interface adapter driver, such as interface adapter driver 116 of FIG. 1B. The filesystem calls the adapter driver to prepare a process context to allow execution of future process I/Os via the superpipe.

At operation 310, an adapter queue (referring to the interface adapter, such as interface adapter 120 from FIG. 1B) for the process is allocated in the kernel's memory. At operation 312, the module maps the adapter queue into a process address space. The queue may generally perform a buffer function, and hold various entities (data, objects, events, etc.) for later processing. In embodiments, the process address space may be in the application or otherwise in the user space. The process address space may be in a processor memory space. The processor memory space may be shared with the interface adapter. In embodiments, the process context provided to the interface adapter by the filesystem allows the adapter to access appropriate user context in the application.

At operation 314, the module saves the context information of the process. The context information may be saved to a hash table, a segment table, or other kernel memory structure.

At operation 316, an interrupt handler is created for the process. In embodiments, the interrupt handler may be generated by the interface module, by the interface adapter, or by another component in the kernel or the storage hardware. It may be advantageous to allow the interface module to manage the interrupt handler, as the interface module may use an interrupt handler to interrupt execution of an I/O by the OS stack and to support execution of the same I/O via the superpipe. In embodiments, the interface adapter 120 may issue an interrupt handler at the completion of an I/O command.

The method may then proceed to operation 318, and, now that the context is prepared to run I/Os via the superpipe, opens the file using the existing procedure. By preparing and saving the process context, as in operations 308-314, the interface module prepares the system to perform I/O's via the superpipe on the open file. The file is opened using the OS's existing procedure, and I/O's executed on the open file may be performed using the superpipe and the saved context.

Figure 4:
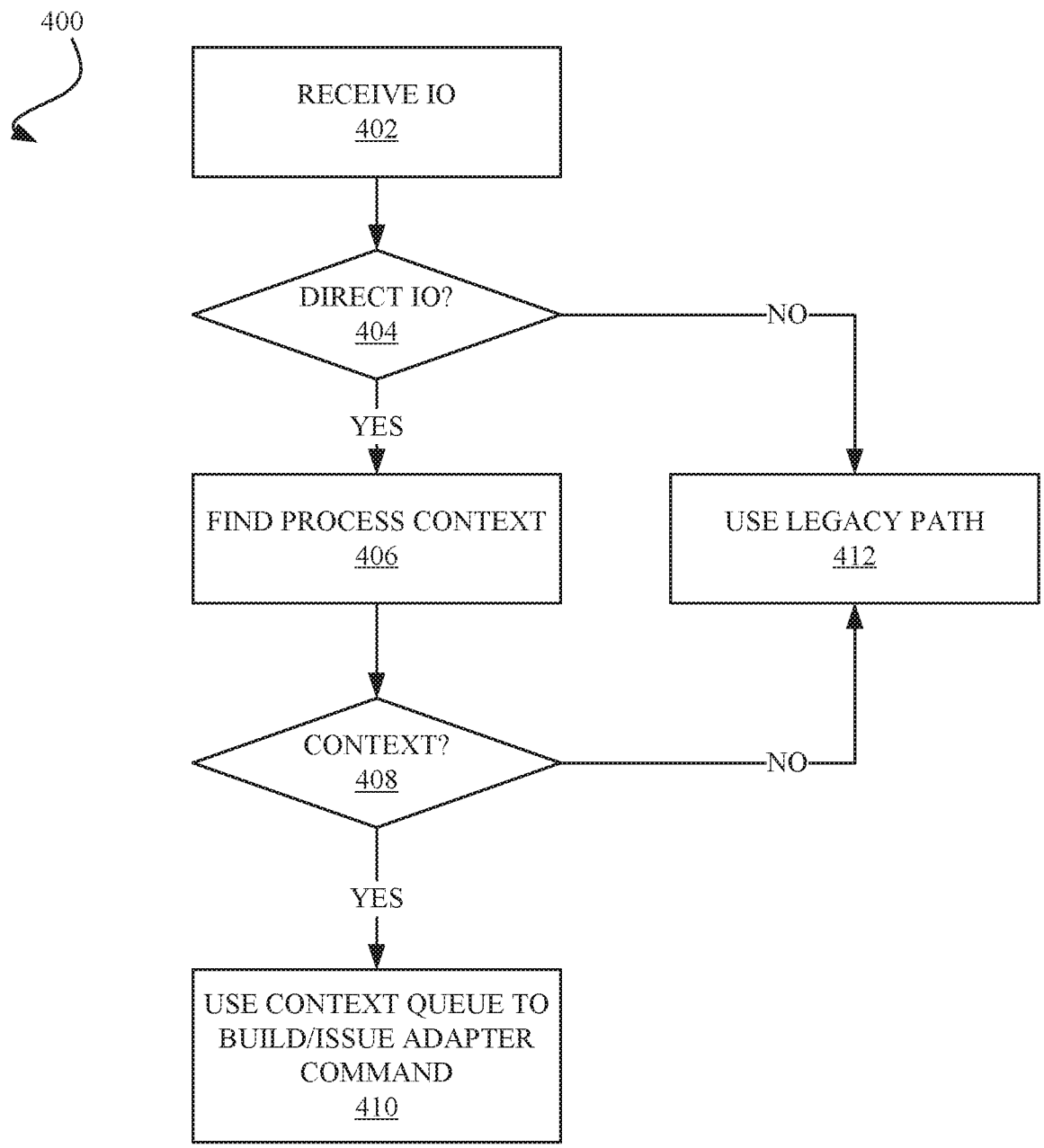
FIG. 4 depicts a flowchart of an example I/O issue procedure, according to embodiments of the present disclosure.

Referring now to FIG. 4, a flowchart of an I/O issue flow procedure 400 is depicted, according to embodiments of the present disclosure. Procedure 400 may be executed by one or more processors and involve a filesystem (e.g. filesystem 112 of FIG. 1B) and/or an interface module (e.g. interface module 124 of FIG. 1B).

At operation 402, the filesystem receives an I/O issued by a user process in an application.

At decision block 404, the module determines whether the received I/O is a direct I/O. In embodiments, a direct I/O can be identified by the presence of a user context in the data buffer. Other (buffered or non-direct) I/Os may be identified by the presence of a kernel address in the data buffer or as containing metadata or management commands, or may be identified as not originating from the application. If the I/O is determined to not be a direct I/O, the method proceeds to operation 412 and executes the I/O via the legacy path (e.g. the OS stack).

If at decision block 404, the I/O is determined to be a direct I/O, then the method proceeds to operation 406 and locates the context for the process. The context may be located by the module and within the kernel memory. Contexts may be stored within the memory using any number of data structures.

At decision block 408, the module determines whether a context for the process issuing the I/O exists. If a pre-existing context is not found, the method may proceed to operation 412, and execute the I/O using the legacy OS stack. In embodiments, a context may be created for the process at this point, using a method similar to operation 308-316 of method 300. If, at decision block 408, a process context is found, the method may proceed to operation 410 and use the located context queue to execute the I/O via the superpipe.

At operation 410, the module builds and issues an adapter command according to the stored context. Issuing the command in this way, according to the stored process context, gives the appearance to the interface adapter that the commands are allocated in process.

Figure 5:
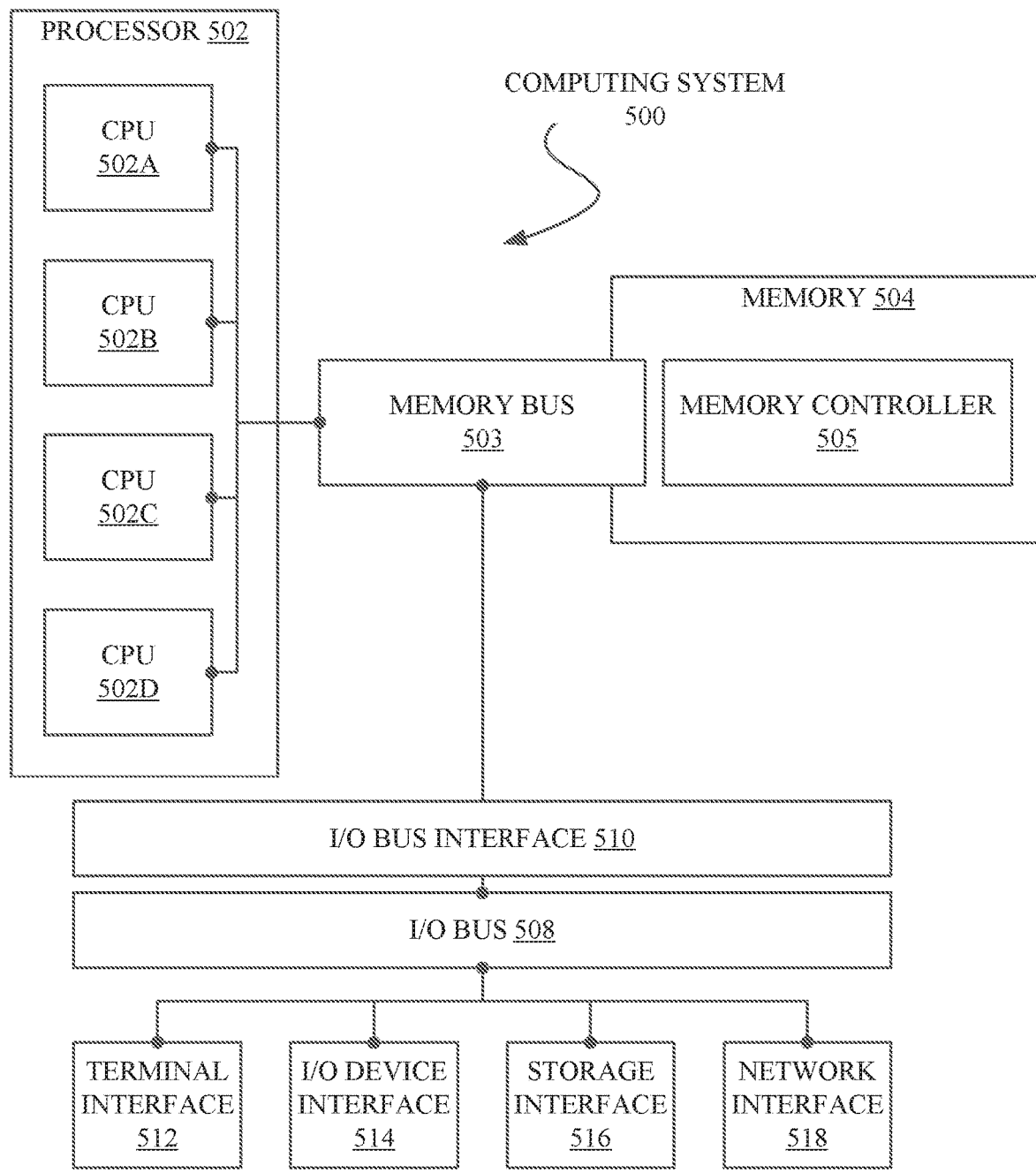
FIG. 5 depicts a high-level block diagram of an example computer system that may be used in implementing the methods or modules described herein, in accordance with embodiments of the present disclosure.

Referring now to FIG. 5, shown is a high-level block diagram of an example computer system (i.e., computer) 500 that may be used in implementing one or more of the methods or modules, and any related functions or operations, described herein (e.g., using one or more processor circuits or computer processors of the computer), in accordance with embodiments of the present disclosure. In some embodiments, the major components of the computer system 500 may comprise one or more CPUs 502, a memory subsystem 504, a terminal interface 512, an I/O (Input/Output) device interface 514, a storage interface 516, and a network interface 518, all of which may be communicatively coupled, directly or indirectly, for inter-component communication via a memory bus 503, an I/O bus 508, and an I/O bus interface unit 510.

The computer system 500 may contain one or more general-purpose programmable central processing units (CPUs) 502A, 502B, 502C, and 502D, herein generically referred to as the CPU 502. In some embodiments, the computer system 500 may contain multiple processors typical of a relatively large system; however, in other embodiments the computer system 500 may alternatively be a single CPU system. Each CPU 502 may execute instructions stored in the memory subsystem 504 and may comprise one or more levels of on-board cache.

In some embodiments, the memory subsystem 504 may comprise a random-access semiconductor memory, storage device, or storage medium (either volatile or non-volatile) for storing data and programs. In some embodiments, the memory subsystem 504 may represent the entire virtual memory of the computer system 500, and may also include the virtual memory of other computer systems coupled to the computer system 500 or connected via a network. The memory subsystem 504 may be conceptually a single monolithic entity, but, in some embodiments, the memory subsystem 504 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 504 may contain elements for control and flow of memory used by the CPU 502. This may include a memory controller 505.

Although the memory bus 503 is shown in FIG. 5 as a single bus structure providing a direct communication path among the CPUs 502, the memory subsystem 504, and the I/O bus interface 510, the memory bus 503 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 500 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 500 may be a multi-user mainframe computer system, a single-user system, or a server computer or similar device that has little or no direct user interface, but receives requests from other computer systems (clients). Further, in some embodiments, the computer system 500 may be implemented as a desktop computer, portable computer, laptop or notebook computer, tablet computer, pocket computer, telephone, smart phone, mobile device, or any other appropriate type of electronic device.

It is noted that FIG. 5 is intended to depict the representative major components of an exemplary computer system 500. In some embodiments, however, individual components may have greater or lesser complexity than as represented in FIG. 5, components other than or in addition to those shown in FIG. 5 may be present, and the number, type, and configuration of such components may vary.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for implementing an interface superpipe in a filesystem comprising:
   receiving, by a filesystem in a kernel, a first command to open a file, the first command to open a file issued in the execution of a process in an application;
   determining that the file is on an interface disk;
   determining that a context does not exist for the process and in response:
      allocating an adapter queue for the process in a kernel memory; and
      mapping the adapter queue into a process address space associated with the process;
   saving the context information of the process in the kernel memory;
   receiving a second command to open the file according to the process;
   determining that the file is on the interface disk;
   determining that the context does exist in the kernel for the process; and
   retrieving the context for the process.

2. The method of claim 1, wherein determining that a context does exist for the process comprises locating process context information in the kernel memory.

3. The method of claim 1, wherein determining that the file is on an interface disk comprises detecting an interface adapter.

4. The method of claim 1, further comprising:
   mounting the filesystem;
   querying a storage disk for disk information;
   determining, according to the disk information, that the storage disk is the interface disk; and
   saving the disk information in the kernel.

5. A computer-implemented method for implementing an interface superpipe in a filesystem comprising:
   receiving, by a filesystem in a kernel, a first command to open a file, the first command to open a file issued in the execution of a process in an application;
   determining that the file is on an interface disk;
   determining that a context does not exist for the process and in response:
      allocating an adapter queue for the process in a kernel memory; and
      mapping the adapter queue into a process address space associated with the process;
   saving the context information of the process in the kernel memory;
   receiving an I/O according to the process;
   determining that the I/O is a direct I/O;
   retrieving, in response to determining that the I/O is a direct I/O, the context for the process;
   building an adapter command according to the context; and
   issuing the adapter command to the interface adapter.

6. The method of claim 5, further comprising:
   detecting that the interface adapter has called an interrupt handler; and
   determining, in response to detecting that the interface adapter has called an interrupt handler, that the interface adapter has completed execution of the I/O.

7. A computer-implemented method for implementing an interface superpipe in a filesystem comprising:
   receiving, by a filesystem in a kernel, a first command to open a file, the first command to open a file issued in the execution of a process in an application;
   determining that the file is on an interface disk;
   determining that a context does not exist for the process and in response:
      allocating an adapter queue for the process in a kernel memory; and
      mapping the adapter queue into a process address space associated with the process;
   saving the context information of the process in the kernel memory;
   receiving an I/O;
   determining that the I/O is not a direct I/O; and
   executing, in response to determining that the I/O is not a direct I/O, the I/O via an operating system I/O stack.

* * * * *